US012662268B2

(12) United States Patent
Kim et al.

(10) Patent No.: US 12,662,268 B2
(45) Date of Patent: Jun. 23, 2026

(54) HEAT EXCHANGER AND AIRPLANE COMPRISING SAME

(71) Applicant: PLANA CO., LTD., Yongin-si (KR)

(72) Inventors: Braden J. Kim, Suwon-si (KR); Sang Hyun Jung, Anyang-si (KR)

(73) Assignee: PLANA CO., LTD., Yongin-si (KR)

( * ) Notice: Subject to any disclaimer, the term of this patent is extended or adjusted under 35 U.S.C. 154(b) by 0 days.

(21) Appl. No.: 18/870,645

(22) PCT Filed: Oct. 13, 2022

(86) PCT No.: PCT/KR2022/015480

§ 371 (c)(1),
(2) Date: Dec. 24, 2024

(87) PCT Pub. No.: WO2023/234488

PCT Pub. Date: Dec. 7, 2023

(65) Prior Publication Data

US 2025/0326487 A1 Oct. 23, 2025

(30) Foreign Application Priority Data

May 30, 2022 (KR) ........................ 10-2022-0065964

(51) Int. Cl.
*B64U 20/96* (2023.01)
*B64U 20/98* (2023.01)

(52) U.S. Cl.
CPC .............. *B64U 20/96* (2023.01); *B64U 20/98* (2023.01)

(58) Field of Classification Search
CPC ................ B64C 29/0058; B64C 27/20; B64U 20/90–98; B64U 10/13; B64D 13/006
See application file for complete search history.

(56) References Cited

U.S. PATENT DOCUMENTS

| | | | | |
|---|---|---|---|---|
| 2017/0200961 A1* | 7/2017 | Zheng | ............... | H01M 8/04208 |
| 2020/0010200 A1* | 1/2020 | Chen | ...................... | B64D 47/00 |
| 2021/0237888 A1* | 8/2021 | Wong | ...................... | B64C 1/061 |

FOREIGN PATENT DOCUMENTS

| | | | |
|---|---|---|---|
| JP | 2005-024229 A | 1/2005 | |
| JP | 2007-038925 A | 2/2007 | |
| JP | 2014-019357 A | 2/2014 | |
| JP | 2021-515726 A | 6/2021 | |
| JP | 7099776 B1 | 7/2022 | |
| KR | 10-2011-0030192 A | 3/2011 | |
| KR | 10-2014-0125222 A | 10/2014 | |
| KR | 10-1901584 B1 | 9/2018 | |
| KR | 10-2020-0009782 A | 1/2020 | |
| KR | 10-2077291 B1 | 2/2020 | |
| KR | 10-2285303 B1 | 8/2021 | |

* cited by examiner

*Primary Examiner* — Ashesh Dangol
(74) *Attorney, Agent, or Firm* — INVENSTONE PATENT, LLC

(57) ABSTRACT

A heat exchanger configured to perform heat exchange for a heat source of a fuselage and provide thrust or thrust vectoring to the fuselage, and an aircraft including the same are disclosed. The aircraft includes a fuselage, at least one inlet provided at a side of the fuselage, at least one outlet provided at a bottom of the fuselage, and a fan unit having at least one fan disposed between the inlet and the outlet along a fluid flow direction and drawing air inward through the at least one inlet to discharge through the at least one outlet.

19 Claims, 16 Drawing Sheets

210:210a,210b

205

240:241,242

HEAT EXCHANGER AND AIRPLANE COMPRISING SAME

CROSS-REFERENCE TO RELATED APPLICATIONS

This application is a National Stage filing under 35 U.S.C. 371 of International Application No. PCT/KR2022/015480, filed on Oct. 13, 2022, which claims the benefit of earlier filing date and right of priority to Korean Application No. 10-2022-0065964, filed on May 30, 2022, in the Korean Intellectual Property Office, the contents of which are all hereby incorporated by reference herein in their entirety.

TECHNICAL FIELD

The present invention relates to a heat exchanger configured to perform heat exchange for a heat source of a fuselage and provide thrust or thrust vectoring to the fuselage, and an aircraft including the same.

BACKGROUND ART

Conventionally, flying vehicles such as aircraft and fighters that fly in the air typically obtained power through engines and were equipped with air-cooled engine cooling systems.

However, as technology development for various types of flying vehicles has become active recently, there is increasing interest in flying vehicles that obtain power through electric drive motors in addition to engines, and cooling systems for these drive motors.

Also, since conventional aircraft and fighters require very long runways for takeoff and landing, various flying vehicles being developed recently are equipped with Vertical Take-off and Landing (VTOL) systems that do not require runways.

To implement a vertical take-off and landing system, lift generation exceeding the weight of the flying vehicle is required. For this, recently developed various flying vehicles are designed to generate lift and thrust through multiple propellers to lift off and fly the fuselage.

At this time, since the efficiency of the vertical take-off and landing system varies according to the weight of the fuselage, the generated lift or thrust, and accordingly, the time required for takeoff and landing, flight speed, and flight time are greatly affected, development of various technologies is required to increase efficiency in vertical takeoff and landing or flight of the flying vehicle.

The background art described above should not be considered as already known to those skilled in the art simply because it has been described as background for understanding the present invention.

DETAILED DESCRIPTION OF THE INVENTION

Technical Problem

The present invention is proposed to solve such problems, and aims to provide a heat exchanger configured to perform heat exchange for a heat source of a fuselage and provide thrust or thrust vectoring to the fuselage, and an aircraft including the same.

Technical Solution

According to embodiments of the present invention to achieve the above objective, an aircraft includes: a fuselage;

at least one inlet provided at a side of the fuselage; at least one outlet provided at a bottom of the fuselage; and a fan unit disposed between the inlet and the outlet along a direction of fluid flow and having at least one fan that draws air inward through the at least one inlet and discharges it through the at least one outlet.

The at least one fan is provided in plurality.

The plurality of fans are arranged in a width direction of the fuselage.

The plurality of fans are arranged in a length direction of the fuselage.

The plurality of fans are individually controlled.

The aircraft includes at least one first opening/closing plate that opens and closes the at least one inlet.

The aircraft includes at least one second opening/closing plate that opens and closes the at least one outlet.

The at least one first opening/closing plate is rotatably coupled to the fuselage and can adjust the opening degree of the inlet.

The at least one second opening/closing plate is rotatably coupled to the fuselage and can adjust the opening degree of the outlet.

The at least one inlet includes a first inlet and a second inlet disposed on each side of the fuselage, and the at least one first opening/closing plate is provided in plurality to respectively open and close the first inlet and the second inlet.

The plurality of first opening/closing plates are individually controlled.

The at least one outlet includes a first outlet and a second outlet disposed on the bottom of the fuselage, and the at least one second opening/closing plate is provided in plurality to respectively open and close the first outlet and the second outlet.

The plurality of second opening/closing plates are individually controlled.

The plurality of fans include a first fan and a second fan disposed on each side of the fuselage, and the first outlet is disposed at a position corresponding to the first fan, and the second outlet is disposed at a position corresponding to the second fan.

The aircraft is configured such that thrust or thrust vectoring acts on the fuselage through control of the plurality of fans.

The aircraft is configured such that thrust or thrust vectoring acts on the fuselage through control of the plurality of first opening/closing plates.

The aircraft is configured such that thrust or thrust vectoring acts on the fuselage through control of the plurality of second opening/closing plates.

The fan unit is configured to guide heat generated in the fuselage to the outside of the fuselage by discharging air drawn into the interior of the fuselage through the at least one inlet through the at least one outlet.

The fan unit includes: a housing; and a medium flow path provided inside the housing through which heat exchange medium can flow; and the at least one fan is rotatably disposed inside the housing to draw air from around the housing into the inside of the housing and discharge it to the outside of the housing, thereby promoting heat exchange between the air around the housing and the heat exchange medium flowing through the medium flow path, and providing thrust or thrust vectoring to the fuselage.

The at least one fan is provided in plurality, and the housing has a plurality of receiving holes that respectively accommodate the plurality of fans.

The housing includes at least one support rib extending from the inner circumferential surface of the receiving hole to support the fan.

The at least one support rib is provided in plurality and spaced apart along the circumferential direction of the receiving hole.

The fan includes: a fan blade; and a fan drive motor that rotationally drives the fan blade; and the at least one support rib supports the fan drive motor.

The fan unit includes at least one separation membrane that separates air flow between the plurality of fans or prevents interference of air flows generated by the plurality of fans.

The aircraft includes: a plurality of wings extending from the fuselage; and a plurality of rotors provided on each of the plurality of wings; and is configured to control movement of the fuselage by controlling at least one of the plurality of rotors and at least one of the plurality of fans.

According to embodiments of the present invention, an aircraft includes: a fuselage; a heat exchanger disposed inside the fuselage; at least one inlet formed in a side portion of the fuselage and guiding fluid from outside the fuselage to the heat exchanger; and at least one outlet formed in a bottom portion of the fuselage and guiding fluid heat-exchanged in the heat exchanger to the outside of the fuselage; wherein the heat exchanger provides thrust or thrust vectoring to the fuselage by discharging fluid drawn into the interior of the fuselage through the at least one inlet through the at least one outlet.

The heat exchanger includes: a housing; and at least one fan rotatably disposed inside the housing and discharging fluid drawn into the interior of the fuselage through the at least one inlet through the at least one outlet.

The at least one fan is provided in plurality, and the heat exchanger further includes at least one separation membrane provided inside or outside the housing to separate air flow between the plurality of fans or prevent interference of air flows generated by the plurality of fans.

According to embodiments of the present invention, a heat exchanger disposed inside a fuselage of an aircraft to perform heat exchange includes: a housing; a medium flow path provided inside the housing through which heat exchange medium can flow; at least one fan rotatably disposed inside the housing; wherein the fan draws air from around the housing into the inside of the housing and discharges it to the outside of the housing, thereby promoting heat exchange between the air around the housing and the heat exchange medium flowing through the medium flow path, and providing thrust or thrust vectoring to the fuselage.

The at least one fan is provided in plurality, and the housing has a plurality of receiving holes that respectively accommodate the plurality of fans.

The housing includes at least one support rib extending from the inner circumferential surface of the receiving hole to support the fan.

The at least one support rib is provided in plurality and spaced apart along the circumferential direction of the receiving hole.

The fan includes: a fan blade; and a fan drive motor that rotationally drives the fan blade; and the support rib supports the fan drive motor.

Effects of the Invention

According to the heat exchanger and aircraft including the same of the present invention, since a cooling system for the power source (heat source) is essential in aircraft, heat exchange can be performed for the heat source of the fuselage while simultaneously providing thrust or thrust vectoring to the fuselage, thereby improving takeoff and landing efficiency or flight efficiency of the aircraft.

MODES OF THE INVENTION

Figure 1:
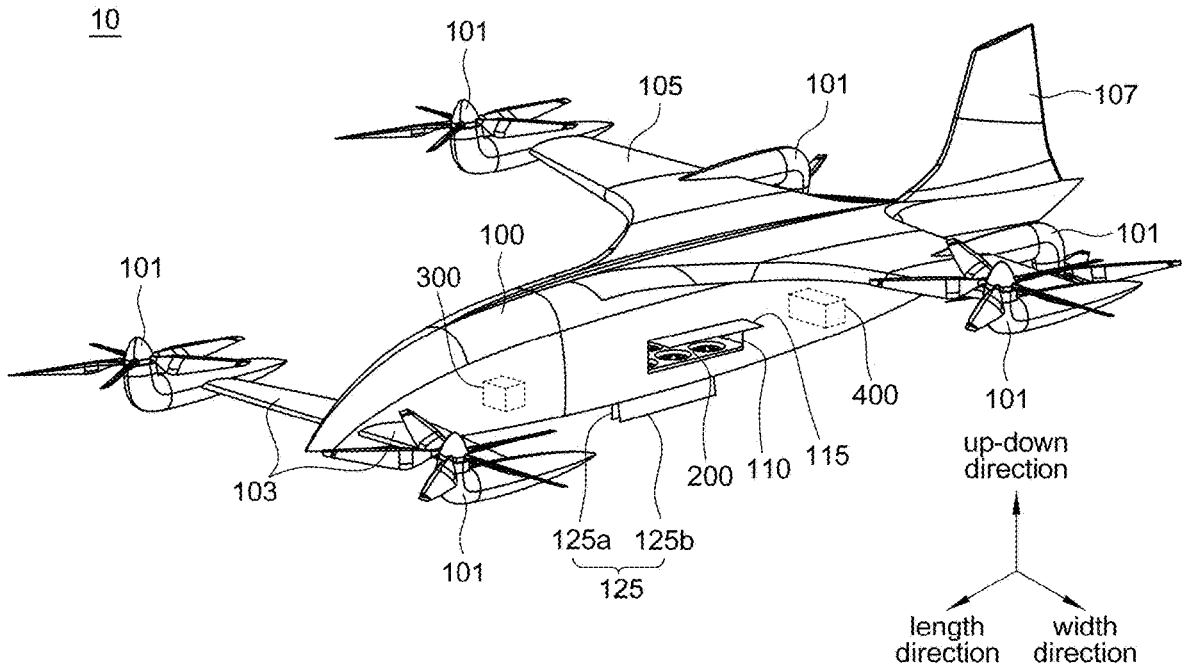
FIG. 1 is a perspective view showing an aircraft according to an embodiment of the present invention.

Embodiments described in this specification can be modified in various ways. Specific embodiments may be illustrated in the drawings and described in detail. However, the specific embodiments disclosed in the attached drawings are merely for facilitating understanding of various embodiments. Therefore, the technical idea is not limited by the specific embodiments disclosed in the attached drawings, and should be understood to include all equivalents or substitutes within the scope of the invention's spirit and technology.

Terms including ordinal numbers such as "first," "second," etc. may be used to describe various components, but these components are not limited by these terms. These terms are used only for the purpose of distinguishing one component from another component.

In this specification, terms such as "include" or "have" are intended to indicate the existence of features, numbers, steps, operations, components, parts, or combinations thereof described in the specification, and should not be understood as precluding the presence or addition of one or more other features, numbers, steps, operations, components, parts, or combinations thereof. When a component is mentioned as being "connected" or "coupled" to another component, it should be understood that it may be directly connected or coupled to the other component, but other components may also exist in between. Conversely, when a component is mentioned as being "directly connected" or "directly coupled" to another component, it should be understood that no other components exist in between.

Meanwhile, "modules" or "units" used for components in this specification perform at least one function or operation. And "modules" or "units" can perform functions or operations by hardware, software, or a combination of hardware and software. Also, except for "modules" or "units" that must be performed on specific hardware or performed on at least one processor, multiple "modules" or multiple "units" can be integrated into at least one module. Singular expressions include plural expressions unless the context clearly indicates otherwise.

Furthermore, in explaining the present invention, detailed description of related known functions or configurations will be omitted when it is determined that they may unnecessarily obscure the essence of the present invention.

Hereinafter, various embodiments will be described in more detail with reference to the attached drawings.

Figure 2:
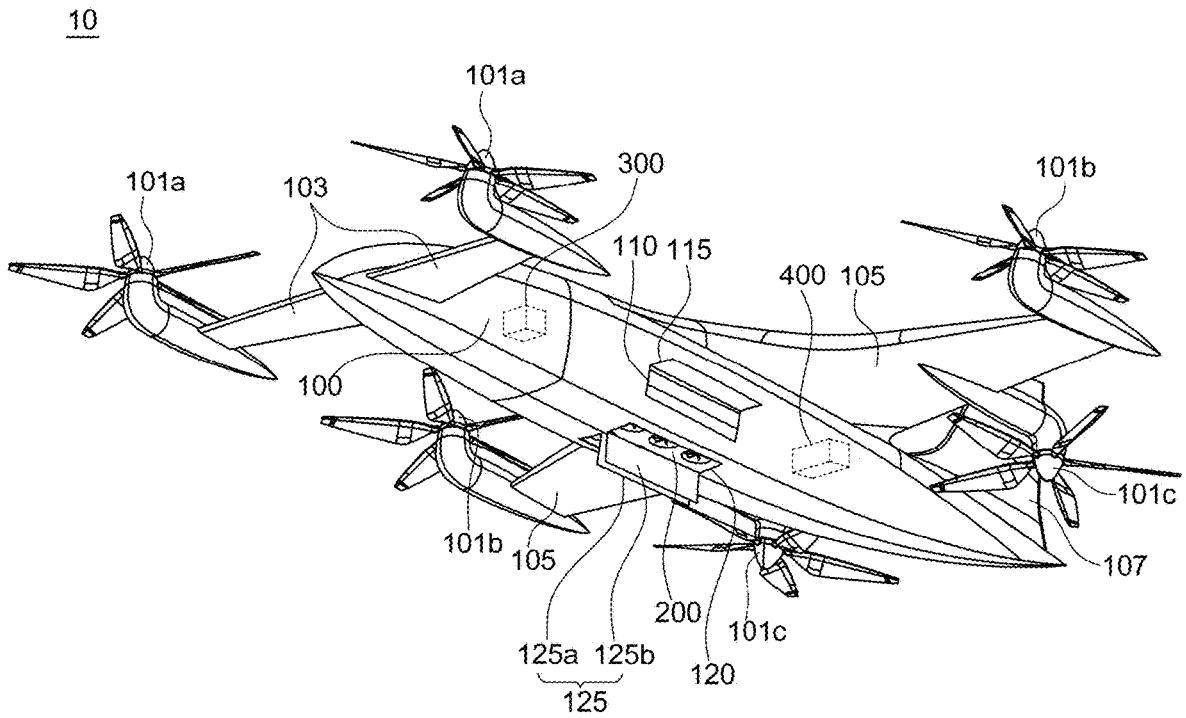
FIG. 2 is a bottom perspective view showing an aircraft according to an embodiment of the present invention.
Figure 3:
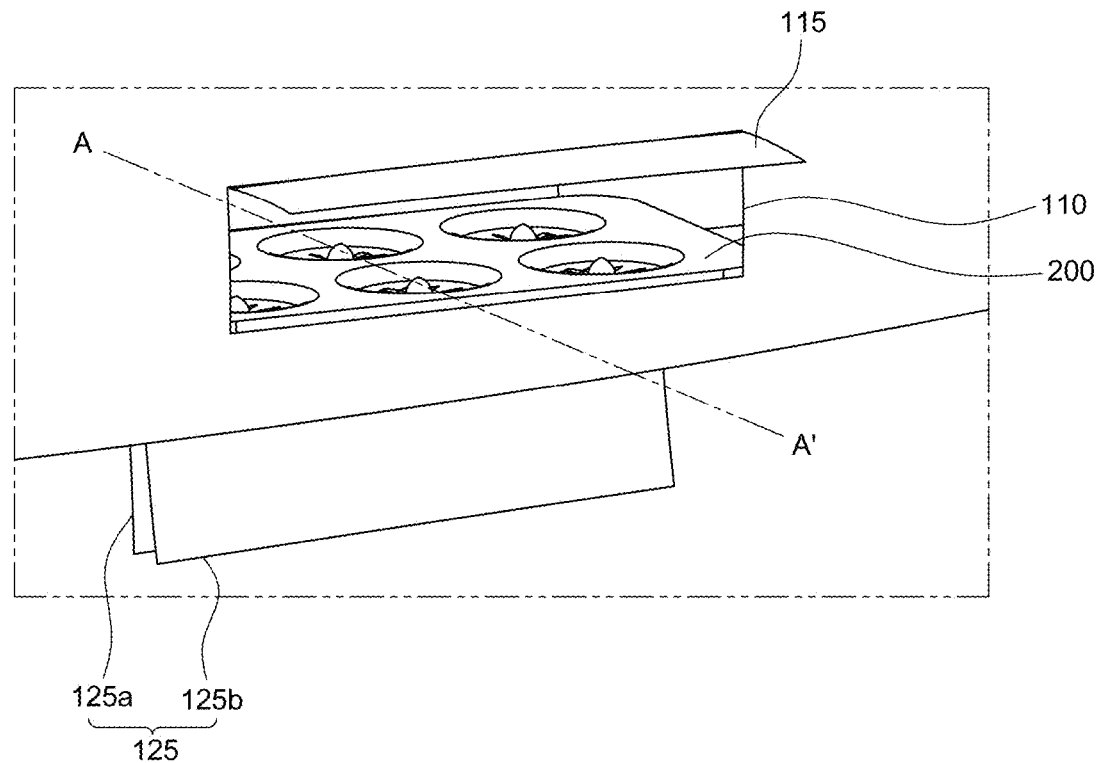
FIG. 3 is an enlarged view of an inlet of an aircraft according to an embodiment of the present invention.
Figure 4:
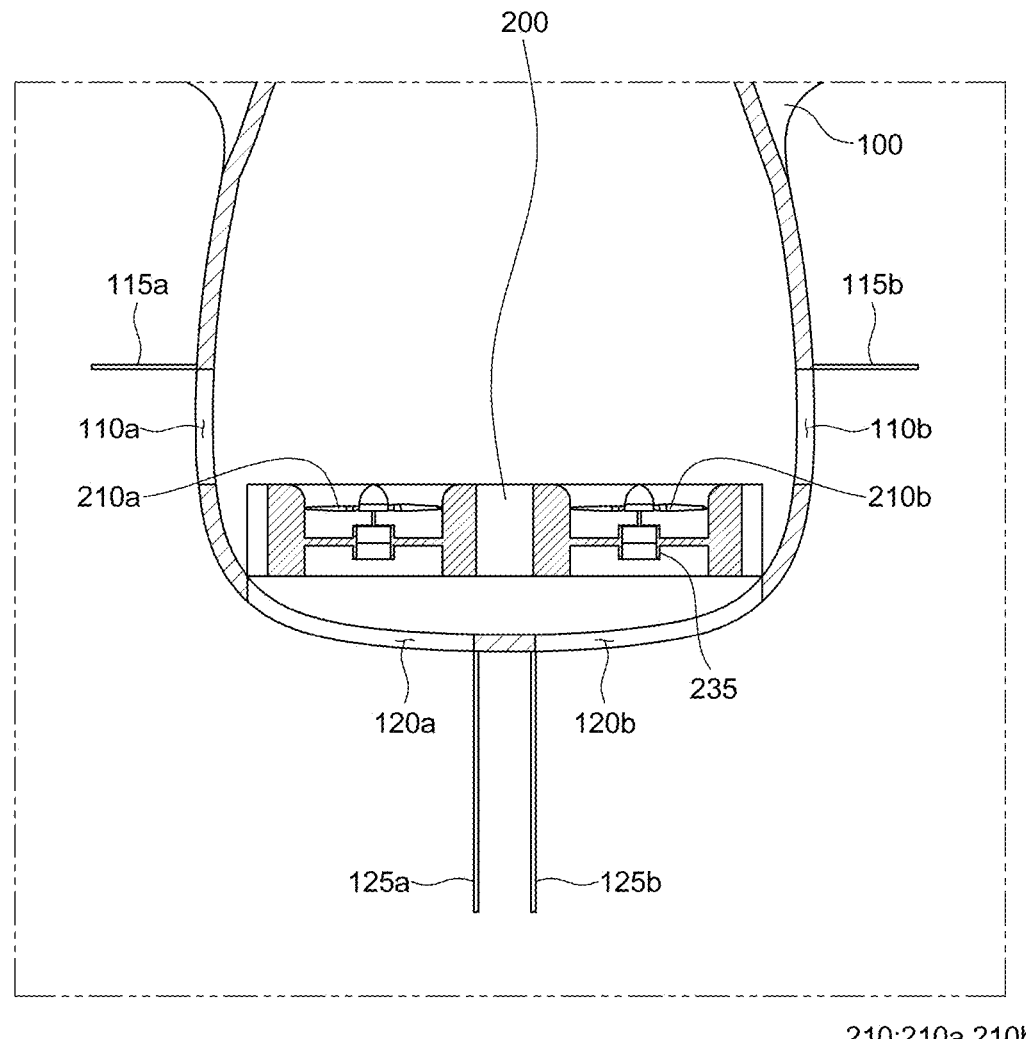
FIG. 4 is a cross-sectional view showing an aircraft according to an embodiment of the present invention taken along line A-A of FIG. 3.
Figure 5:
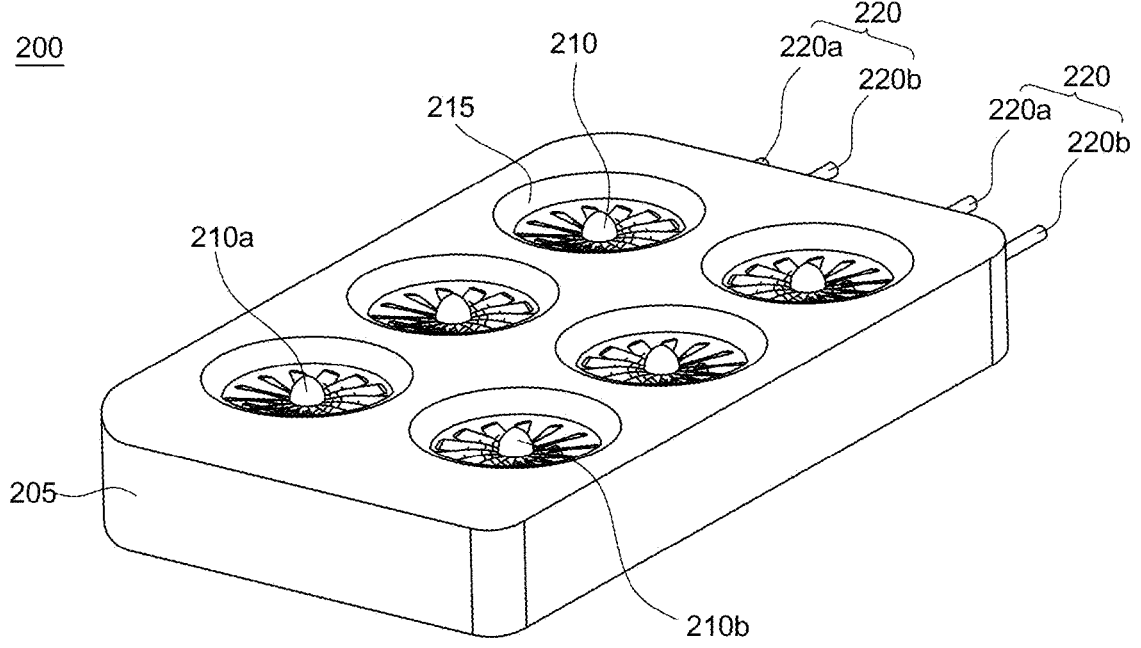
FIG. 5 is a perspective view showing a heat exchanger according to an embodiment of the present invention.
Figure 6:
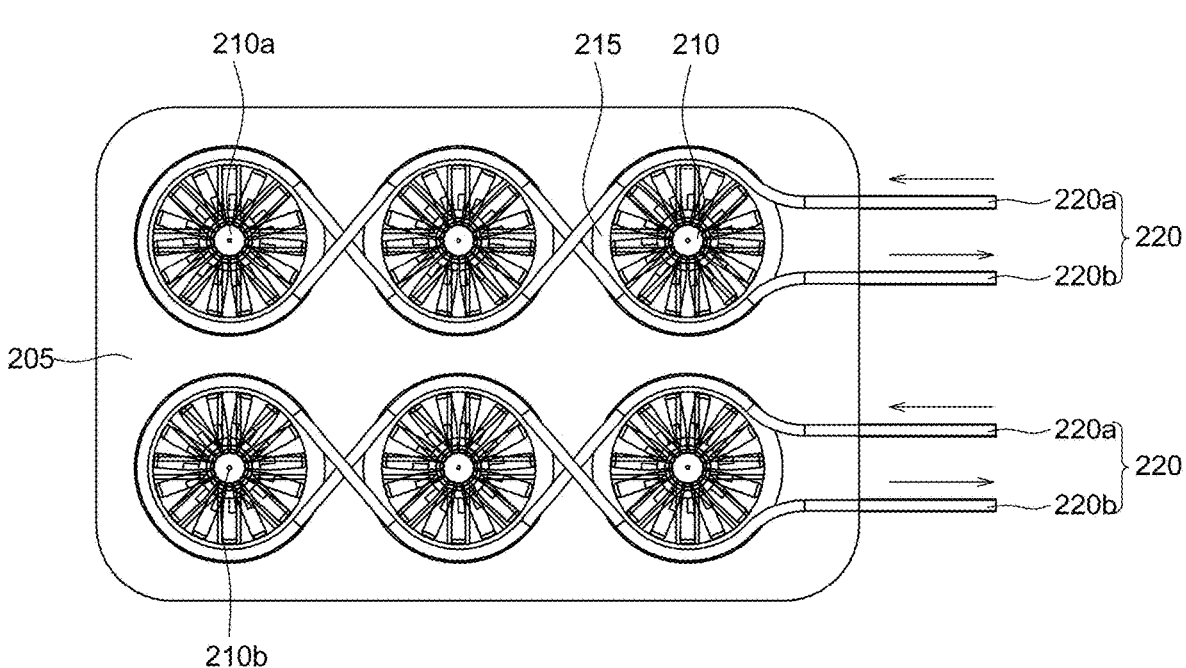
FIG. 6 is a plan view showing a heat exchanger according to an embodiment of the present invention.
Figure 7:
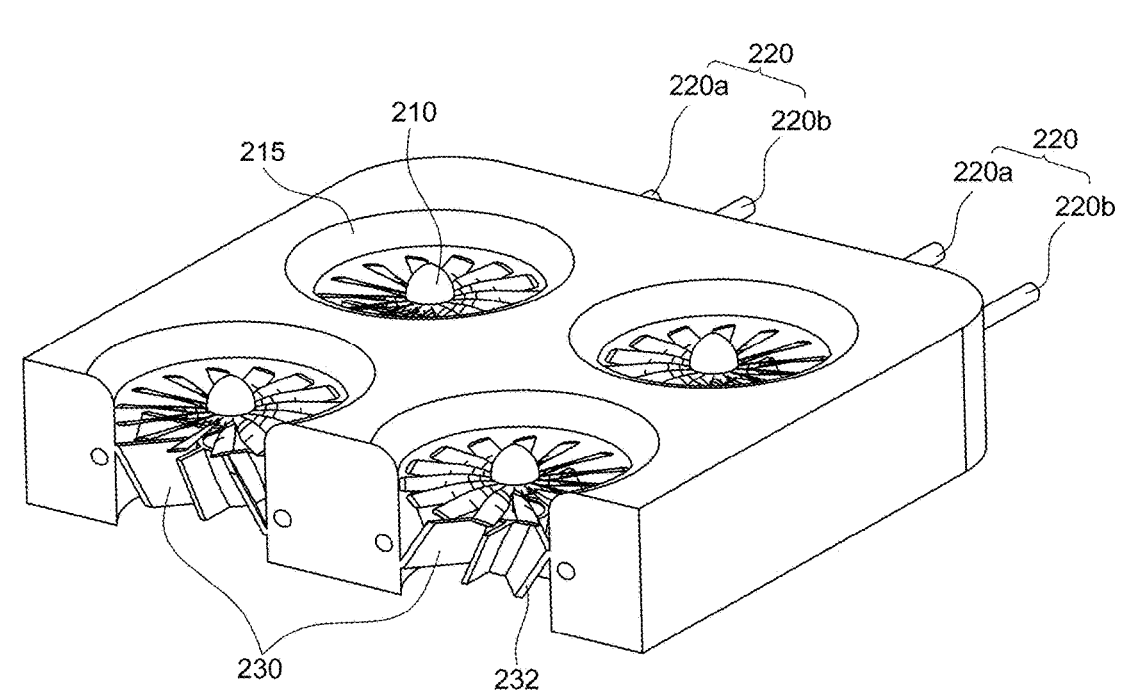
FIG. 7 is a view showing a cross-section of a heat exchanger according to an embodiment of the present invention.
Figure 8:
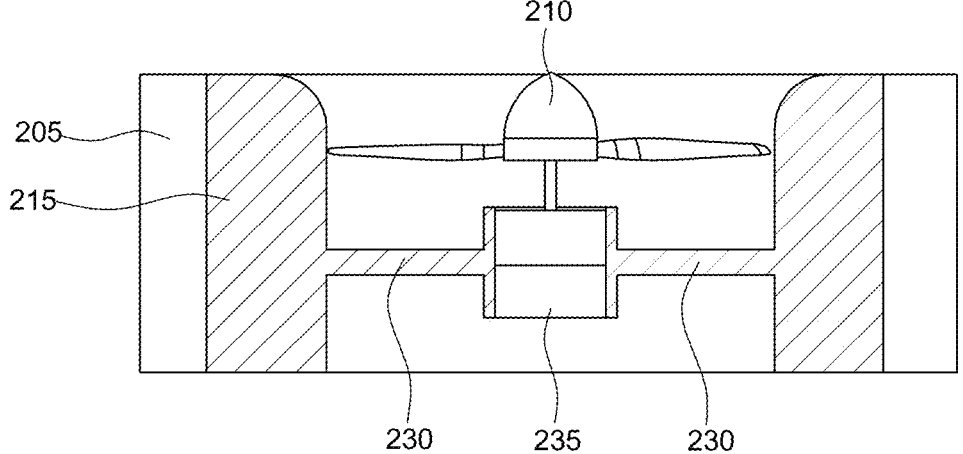
FIG. 8 is a view showing a cross-section of a fan in a heat exchanger according to an embodiment of the present invention.

FIG. 1 is a perspective view showing an aircraft according to an embodiment of the present invention. FIG. 2 is a bottom perspective view showing an aircraft according to an embodiment of the present invention. FIG. 3 is an enlarged view of an inlet of an aircraft according to an embodiment of the present invention. FIG. 4 is a cross-sectional view showing an aircraft according to an embodiment of the present invention taken along line A-A of FIG. 3. FIG. 5 is a perspective view showing a heat exchanger according to an embodiment of the present invention. FIG. 6 is a perspective view showing a heat exchanger according to an embodiment of the present invention. FIG. 7 is a view showing a cross-section of a heat exchanger according to an embodiment of the present invention. FIG. 8 is a view showing a cross-section of a fan in a heat exchanger according to an embodiment of the present invention.

Referring to FIGS. 1 to 8, the aircraft 10 according to an embodiment of the present invention includes a fuselage 100, inlets 110 and outlets 120 formed in different portions of the fuselage 100, and at least one fan 210 disposed between the inlets 110 and outlets 120, wherein heat exchange is performed through fluid flow between the inlets 110 and outlets 120 by the at least one fan 210, and thrust or thrust vectoring is configured to act on the fuselage 100.

The aircraft 10 according to an embodiment of the present invention is an aircraft driven by power sources such as engines or electric drive motors, and these power sources can be considered heat sources as they generate heat during power generation. Additionally, batteries, generators, inverters, etc., that supply power to power sources such as electric drive motors are also heat sources. A proper cooling system must be equipped for heat sources, and general cooling systems are configured to discharge heat generated from heat sources elsewhere through cooling medium, namely cooling water or refrigerant.

Also, the aircraft 10 according to an embodiment of the present invention may include a fuselage 100, at least one inlet 110 provided at a side of the fuselage 100, at least one outlet 120 provided at a bottom of the fuselage 100, and a heat exchanger 200 having at least one fan 210 disposed between the inlet 110 and outlet 120 along the direction of fluid flow and drawing air inward through the inlet 110 to discharge through the outlet 120. Meanwhile, the heat exchanger 200 described below has the same configuration and structure as the fan unit 200 described later, and can perform the same function in the aircraft.

Specifically, referring to FIGS. 1 to 4, the aircraft 10 according to an embodiment of the present invention has a streamlined fuselage 100, and the fuselage 100 is equipped with forward wings 103 at the front, main wings as rear wings 105, and tail wings 107. The forward wings 103 are canard wings, provided as a pair on the left and right sides near the bottom at the very front of the fuselage 100, and have the effect of improving the aircraft's 10 maneuverability, flight performance and efficiency. The rear wings 105 are positioned at the top of the center of the fuselage 100, and like the forward wings 103, can be provided as a pair on the left and right sides, or as shown in FIG. 1, can be provided as a single wing extending to the left and right.

Also, multiple rotors 101 for generating thrust are equipped on each of the forward wings 103 and rear wings 105, and the rotors 101 can each include multiple individual blades. In FIG. 1, the rotors 101 are shown exemplarily as having a structure including 5 individual blades, but this is not limiting, and the number of individual blades can be modified and applied between 2 to 8 blades.

The rotors 101 can be connected to the wings through rotor bodies, and the rotor bodies of the rotors 101 have a streamlined structure extending in the same direction as the fuselage 100, thereby minimizing air resistance according to the rotors 101 or flight direction. The rotors 101 can be tilted relative to the body by being connected to the body through hinges, and accordingly, the direction of thrust generated by the rotors 101 can be changed.

For example, referring to FIG. 1, the rotors 101 provided on the forward wings 103 and rear wings 105 are facing upward or downward, but this is to generate vertical thrust to the fuselage 100, and when these rotors 101 are tilted to face forward or backward, they can generate horizontal thrust to the fuselage 100.

That is, when the aircraft 10 according to an embodiment of the present invention takes off, lands, or hovers, the rotors 101 are tilted to face upward or downward as currently shown in FIGS. 1 and 2 to generate upward thrust to the fuselage 100, and during flight, the rotors 101 can be tilted to face forward or backward to generate forward thrust.

The rotors 101 include first rotors 101a disposed on the forward wings 103 and second rotors 101b and third rotors 101c disposed on the rear wings 105.

The first rotors 101a are provided at each left and right end of the forward wings 103, and are tilted to face forward or upward according to the aircraft's 10 movement. If necessary, the number of first rotors 101a can be increased or decreased. To improve flight performance or efficiency, the first rotors 101a may be disposed at the middle section rather than the left and right ends of the forward wings 103.

Also, the second rotors 101b are provided at each left and right end of the rear wings 105, and are tilted to face forward or upward according to the aircraft's 10 movement. The third rotors 101c are disposed facing backward at points relatively closer to the fuselage 100 than the second rotors 101b, and the individual blades of the third rotors 101c are tilted to face backward or downward. Through the first rotors 101a disposed on the forward wings 103 and the second rotors 101b and third rotors 101c disposed on the rear wings 105, forward or upward thrust is generated to the fuselage 100 during takeoff, landing, hovering and flight of the aircraft 10 according to an embodiment of the present invention.

If necessary, the number of second rotors 101*b* can be increased or decreased. To improve flight performance or efficiency, the second rotors 101*b* may be disposed at the middle section rather than the left and right ends of the rear wings 105.

Referring to FIG. 1, a battery 400 is exemplarily shown at one point of the fuselage 100. At least one battery 400 is provided, and can be disposed inside the fuselage 100 and electrically connected to each of the rotors 101 to supply power to each of the rotors 101. Although not shown, the structure of supplying power to the rotors 101 through the battery 400 can be variously configured as needed, such as one or more batteries 400 supplying power to one rotor 101, or one or more batteries 400 supplying power to multiple rotors 101.

Heat sources such as rotors 101 and battery 400 generate heat during operation and thus can be connected to the heat exchanger 200 equipped in the fuselage 100 through cooling medium lines for cooling.

The heat exchanger 200 includes at least one fan 210 that performs heat exchange by cooling heated cooling medium through fluid flow, and the cooling medium circulates between the rotors 101, battery 400 and heat exchanger 200 to perform heat exchange.

Specifically, the aircraft 10 according to an embodiment of the present invention includes at least one fan 210 provided at the bottom of the fuselage 100, and as the at least one fan 210 operates, air is drawn in from the side of the fuselage 100 and discharged downward from the fuselage 100. The shapes of the inlet 110 and outlet 120 that determine the direction of air intake and discharge can be variously designed to perform optimized flight along with flight control of the fuselage 100.

That is, as the at least one fan 210 discharges air downward from the fuselage 100, it performs cooling of the cooling medium through air passing around the at least one fan 210, and lift or thrust is provided to the fuselage 100 by the at least one fan 210.

The at least one fan 210 may be provided in plurality. The plurality of fans 210 may be arranged in the width direction of the fuselage 100 (hereinafter referred to as the width direction) as shown in FIG. 1 and FIG. 7, and may be arranged in the length direction of the fuselage 100 (hereinafter referred to as the length direction) as shown in FIG. 1 and FIG. 7, and the plurality of fans 210 may each be individually controlled.

That is, when air is discharged downward through the plurality of fans 210, lift or thrust is generated to the fuselage 100, providing all or part of the lift required for vertical takeoff and landing of the fuselage 100, and when the at least one fan 210 is arranged in plurality in the length direction or width direction of the fuselage 100 and each rotation speed is individually controlled, thrust vectoring can act on fuselage 100 to move laterally due to the difference in thrust generated by each fan 210.

The plurality of fans 210 draw fluid into the interior of the fuselage 100 through the side of the fuselage 100 and generate thrust by discharging the fluid drawn into the interior of the fuselage 100 through the bottom of the fuselage 100, which provides auxiliary thrust (lift) in a direction opposing gravity, separately from or in parallel with the heat exchange function, in the aircraft 10 according to an embodiment of the present invention.

Thrust assistance through the plurality of fans 210 is possible up to 50%, and therefore, in the aircraft 10 according to an embodiment of the present invention, vertical auxiliary thrust provision and heat exchange function can be performed simultaneously through the plurality of fans 210, and this auxiliary thrust can contribute to improving flight control margin and reducing noise by sharing thrust overhead with the rotors 101 equipped on the fuselage 100 during transition flight or vertical takeoff and landing flight (VTOL or Hovering Flight).

As shown in FIG. 1, the aircraft 10 according to an embodiment of the present invention includes a controller 300 that controls the fuselage 100. The controller 300 may be provided inside the fuselage 100, or may be implemented in the form of a remote control or autonomous flight system by being provided in a separate server outside the fuselage 100. The controller 300 controls the operation of the rotors 101 provided on the forward wings 103 and rear wings 105 and the heat exchanger 200.

For example, the controller 300 controls the tilting, rotation speed, power distribution, pitch angle, etc. of the rotors 101, and controls the rotation speed, power distribution, cooling medium flow, etc. of the fans 210 equipped in the heat exchanger 200. Also, the opening/closing and opening degree of the first opening/closing plates 115 and second opening/closing plates 125 to be described later are also controlled by the controller 300, thereby improving flight performance and flight efficiency.

Specifically, the aircraft 10 according to an embodiment of the present invention includes at least one fan 210 provided at the bottom of the fuselage 100, and as the at least one fan 210 operates, air is drawn in from the side of the fuselage 100 and discharged downward from the fuselage 100. The shapes of the inlet 110 and outlet 120 that determine the direction of air intake and discharge can be variously designed to perform optimized flight along with flight control of the fuselage 100.

That is, the at least one fan 210 discharges air downward from the fuselage 100, and lift or thrust vectoring can act on the fuselage 100 by the air passing around the at least one fan 210.

Referring to FIG. 4, in the aircraft 10 according to an embodiment of the present invention, the at least one inlet 110 includes a first inlet 110*a* and second inlet 110*b* disposed on each side of the fuselage 100, and the at least one first opening/closing plate 115 includes first opening/closing plate 115*a* on the first inlet 110*a* side and first opening/closing plate 115*b* on the second inlet 110*b* side that respectively open and close the first inlet 110*a* and second inlet 110*b*.

Also, in the aircraft 10 according to an embodiment of the present invention, the at least one outlet 120 includes a first outlet 120*a* and second outlet 120*b* disposed on the bottom of the fuselage 100, and the at least one second opening/closing plate 125 includes second opening/closing plate 125*a* on the first outlet 120*a* side and second opening/closing plate 125*b* on the second outlet 120*b* side that respectively open and close the first outlet 120*a* and second outlet 120*b*.

The plurality of first opening/closing plates 115 and second opening/closing plates 125 can each have their rotation angles individually controlled by the controller 300. The shape or number of first opening/closing plates 115 and second opening/closing plates 125 can be modified according to needs or according to the number of fans 210 or structure of the fuselage 100.

The first opening/closing plates 115 are provided on each of the left and right sides of the fuselage 100, and according to the adjustment of the opening degree of the first opening/closing plate 115b provided on the left side and the first opening/closing plate 115a provided on the right side, the amount of fluid drawn into the fuselage 100 from the left and right sides can differ. If more fluid is drawn in from the right side of the fuselage 100, thrust vectoring acts on the fuselage 100 toward the right side, and if more fluid is drawn in from the left side of the fuselage 100, thrust vectoring acts on the fuselage 100 toward the left side.

The second opening/closing plates 125 can be provided on each of the left and right sides on the bottom surface of the fuselage 100, centered on the outlet 120, corresponding to the first opening/closing plates 115, and the controller 300 can generate thrust vectoring on the fuselage 100 by controlling the opening degree of the left second opening/closing plate 125a and right second opening/closing plate 125b.

The controller 300 controls the aircraft 10's flight mode according to an embodiment of the present invention by controlling the multiple rotors 101, and can individually control the tilting angle, rotation speed, power distribution, pitch angle, etc. of each rotor 101 according to flight modes such as takeoff and landing, flight, hovering, etc., and can also individually control the rotation speed, rotation direction, etc. of each of the fans 210 equipped in the heat exchanger 200.

Referring to FIG. 5, in the aircraft 10 according to an embodiment of the present invention, the at least one fan 210 includes a first fan 210a and second fan 210b disposed on each side of the fuselage 100. The first fan 210a is disposed at a position corresponding to the first outlet 120a, and the second fan 210b can be disposed at a position corresponding to the second outlet 120b.

The plurality of first opening/closing plates 115 or second opening/closing plates 125 can also be utilized as nozzles that control thrust by adjusting the degree of opening (opening degree) of the inlet 110 or outlet 120.

The inlet 110, as shown in FIG. 1, can be provided not only on the side of the fuselage 100 but also on the rear or front part of the fuselage 100 depending on the purpose of improving flight control.

For example, when the inlet 110 is installed at the front part, the inlet 110 can also act to accelerate the aircraft in low-speed sections through air suction, and when installed at the rear part, the inlet 110 can act to decelerate the aircraft in low-speed sections through air suction.

Referring to FIG. 5, when multiple fans 210 are arranged in the width direction of the fuselage 100, lateral thrust can be generated on the aircraft through RPM control of the left and right fans 210. Additionally, lateral thrust can be generated on the aircraft through flow control according to opening degree control of multiple first opening/closing plates 115 or second opening/closing plates 125 on the side or bottom of the fuselage.

When the controller 300 increases the rotation speed of one side's fan 210, thrust or thrust vectoring acts on the fuselage 100 in the direction of the side where the fan's 210 rotation speed was increased due to the difference in left-right suction force. Similarly, when the controller 300 increases the rotation speed of one side's rotor 101, thrust or thrust vectoring acts on the fuselage 100 in the direction of the side where the rotor's 101 rotation speed was increased due to pressure difference.

That is, through integrated control of fans 210 and rotors 101, the fuselage 100 can be controlled to move laterally without tilting. For example, if the rotation speed of at least one of the rotors 101 located on the right side of the forward wings 103 or rear wings 105 becomes relatively larger, thrust or thrust vectoring acts on the fuselage 100 in the right direction and the fuselage 100 may tilt to the right, but if the rotation speed of the left first fan 210a increases simultaneously, thrust or thrust vectoring also acts on the fuselage 100 to the left, reducing or minimizing the degree of rightward tilt of the fuselage 100. Using this principle, by appropriately adjusting the rotation speeds of multiple fans 210 and multiple rotors 101, it becomes possible for the fuselage 100 to move laterally without tilting.

Also, the principle of moving the fuselage 100 laterally without tilting through integrated control of rotors 101 and fans 210 explained above can also be applied between rotors 101 and first opening/closing plates 115 or second opening/closing plates 125.

That is, if the opening degree of one side of the left, right first opening/closing plates 115a, 115b is made different from the other side, thrust or thrust vectoring acts on the fuselage 100 toward one side due to the difference in suction force through the left, right inlets 110a, 110b. Also, if the opening degree of one side of the left, right second opening/closing plates 125a, 125b is made different from the other side, thrust or thrust vectoring acts on the fuselage 100 toward one side due to the difference in fluid discharge amount through the left, right outlets 120a, 120b.

By integrating control of the opening degrees of the left, right first opening/closing plates 115a, 115b or left, right second opening/closing plates 125a, 125b and the rotation speed of rotors 101, the same movement control where the fuselage 100 moves laterally without tilting as explained earlier through integrated control of rotors 101 and fans 210 can be implemented.

When the fuselage 100 moves laterally without tilting in this way, more stable control performance for the fuselage 100 can be secured in weather conditions such as gusts or crosswinds.

In the case of the aircraft 10 according to an embodiment of the present invention, not only is the cooling system implemented through each fan 210, but more precise and stable flight becomes possible and flight efficiency can also be improved as the thrust or rotation speed of multiple rotors 101 and each fan 210, or the opening degree of multiple first opening/closing plates 115 or multiple second opening/closing plates 125 are individually controlled through the controller 300.

Also, as lateral movement is possible without tilting of the fuselage 100, passengers aboard the fuselage 100 can fly comfortably, and flight stability can also be secured as more flexible response to weather conditions is possible.

During takeoff and landing or hovering of the aircraft 10 according to an embodiment of the present invention, the controller 300 first controls the rotors 101 so that the individual blades (propellers) of the rotors 101 are tilted to face upward or downward to generate upward thrust. At this time, the fans 210 of the heat exchanger 200 and the first opening/closing plates 115 and second opening/closing plates 125 are also controlled together to generate thrust or thrust vectoring on the fuselage 100, and through this, they can assist the thrust of the rotors 101 or secure stability during takeoff and landing by preventing shaking of the fuselage 100.

Also, when the aircraft 10 according to an embodiment of the present invention moves, the controller 300 checks the temperature of the rotors 101 or battery 400, and accordingly controls the heat exchanger 200 and cooling system to manage the heat of the fuselage 100, while simultaneously securing flight stability by preventing shaking of the fuselage 100 according to weather conditions by controlling the rotation speed of the fans 210 of the heat exchanger 200, and the opening degree of the first opening/closing plates 115 and second opening/closing plates 125 to generate thrust vectoring on the fuselage 100.

The heat exchanger 200 provides lift or thrust vectoring to the fuselage 100 by discharging fluid drawn into the interior of the fuselage 100 through at least one inlet 110 through at least one outlet 120.

The heat exchanger 200 can be composed of radiators, chillers, etc. commonly used in cooling systems of automobiles or aircraft.

The heat exchanger 200 is disposed inside the fuselage 100, and may be disposed adjacent to the center of gravity of the fuselage 100, or may be disposed at a point away from the center of gravity considering other placement elements.

The heat exchanger 200 may include a housing 205 and at least one fan 210 rotatably disposed inside the housing 205 that discharges fluid drawn into the interior of the fuselage 100 through at least one inlet 110 through at least one outlet 120.

Referring to FIG. 5, the heat exchanger 200 disposed inside the fuselage 100 of the aircraft 10 to perform heat exchange includes: a housing 205, a medium flow path 220 provided inside the housing 205 through which heat exchange medium can flow, and at least one fan 210 rotatably disposed inside the housing 205. The fan 210 draws air from around the housing 205 into the inside of the housing 205 and discharges it to the outside of the housing 205, thereby promoting heat exchange between the air around the housing 205 and the heat exchange medium flowing through the medium flow path 220, and providing lift or thrust vectoring to the fuselage 100.

Referring to FIG. 6, the at least one fan 210 is provided in plurality, and the housing 205 may have a plurality of receiving holes 215 that respectively accommodate the plurality of fans 210.

The medium flow path 220 consists of an inlet channel 220a through which high-temperature cooling medium flows in, and an outlet channel 220b through which cooling medium cooled by the fan 210 flows out.

Also, the medium flow path 220 can be arranged in a zigzag pattern along the row of multiple receiving holes 215 that accommodate multiple fans 210, and can be configured to include multiple flow paths through which different types of cooling medium pass for each row of multiple fans 210.

The multiple receiving holes 215 are structures that enclose the fans 210 and can have various shapes depending on the type or size of the fans 210. The multiple receiving holes 215 are preferably formed of a material with high thermal conductivity as they are the parts where direct heat exchange occurs between the air flowing by the fans 210 and the cooling medium flowing in the medium flow path 220.

The housing 205 may include at least one support rib 230 extending from the inner circumferential surface of the receiving hole 215 to support the fan 210, and the at least one support rib 230 may be provided in plurality and spaced apart along the circumferential direction of the receiving hole 215.

The fan 210 includes a fan blade 232 and a fan drive motor 235 that rotationally drives the fan blade 232, and the support rib 230 can support the fan drive motor 235.

Referring to FIGS. 5 and 6, the fan 210 has multiple fan blades 232 and the number, shape, etc. of the fan blades 232 can be variously designed according to needs.

The fan drive motor 235 is installed on the support rib 230 provided on the inner circumferential surface of the receiving hole 215, and the support rib 230 can also be constructed with a structure or material for heat exchange between cooling medium and air.

The support rib 230 not only supports the fan drive motor 235 and performs heat exchange function, but also serves as a stator to increase the thrust performance of fluid passing through the fan 210.

That is, the support rib 230 can have internal connection structures besides the structure for fixing the fan drive motor 235, and various shapes can be applied according to purposes such as increasing aerodynamic efficiency or cooling performance. Here, internal connection structures can be Vanes installed at the entrance of the receiving hole 215, Stators and additional ducts or nozzles installed at the exit, or piping with various shapes.

Cooling of the fan drive motor 235 that delivers power to the fan 210 and is installed on the support rib 230 can be performed by air cooling through air generated and flowing by the fan 210, or can be performed by water cooling utilizing internal flow through a separate cooling system necessary for cooling.

Figure 9:
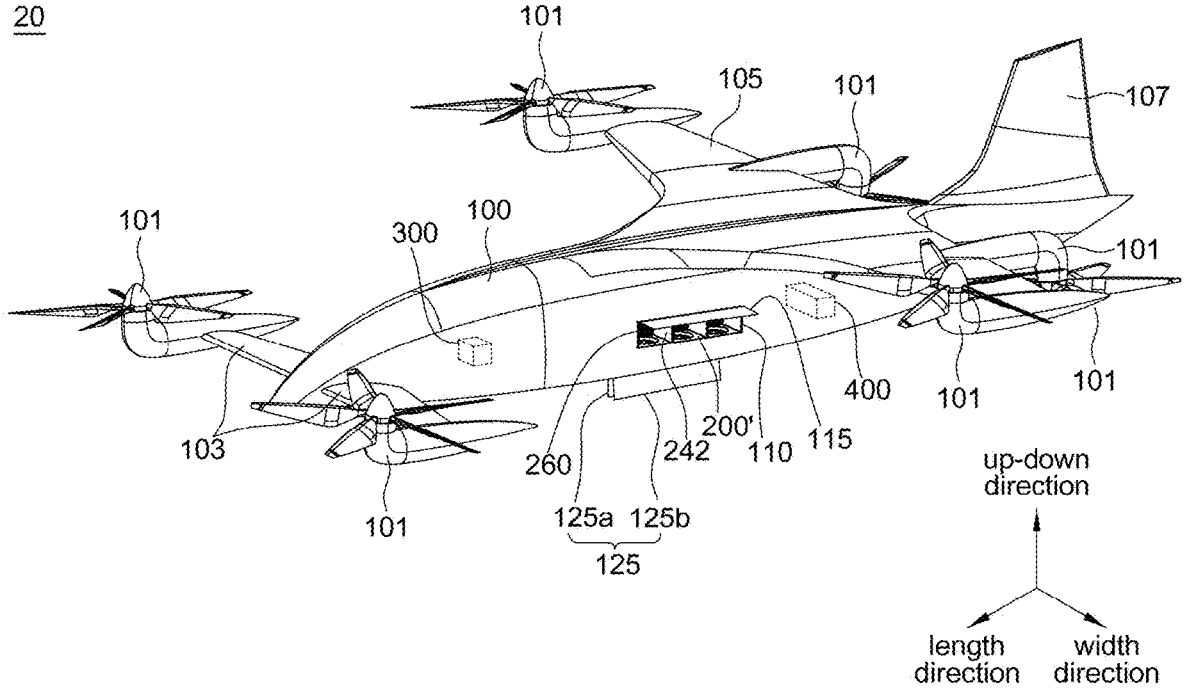
FIG. 9 is a perspective view showing an aircraft according to another embodiment of the present invention.
Figure 10:
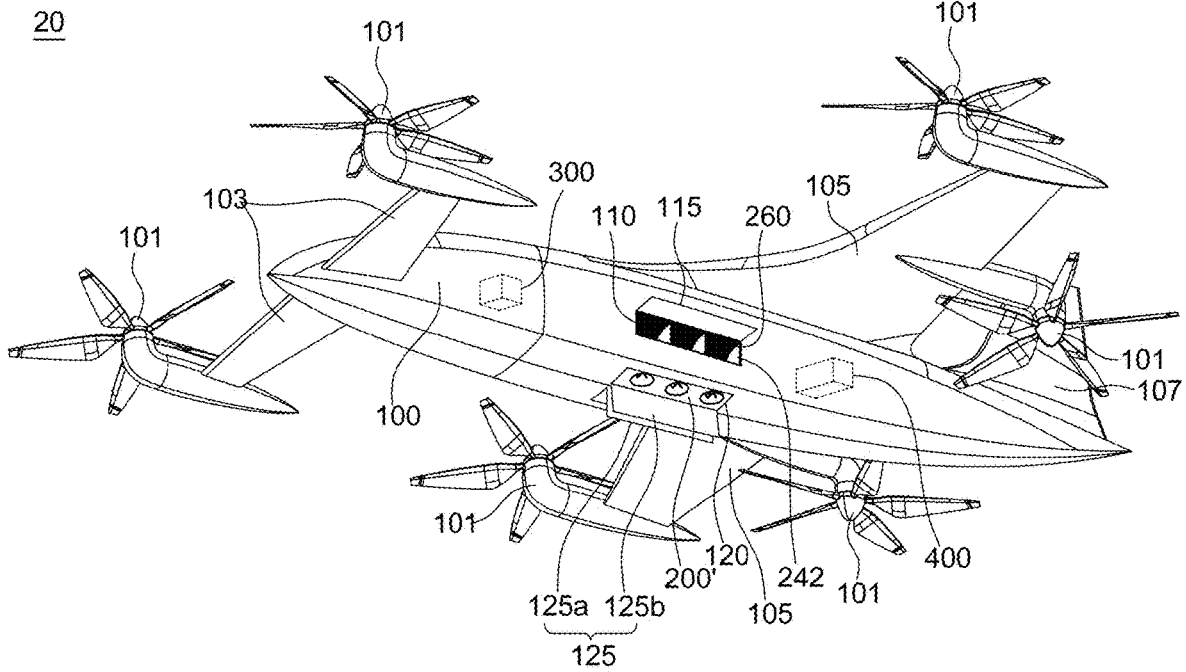
FIG. 10 is a bottom perspective view showing an aircraft according to another embodiment of the present invention.
Figure 11:
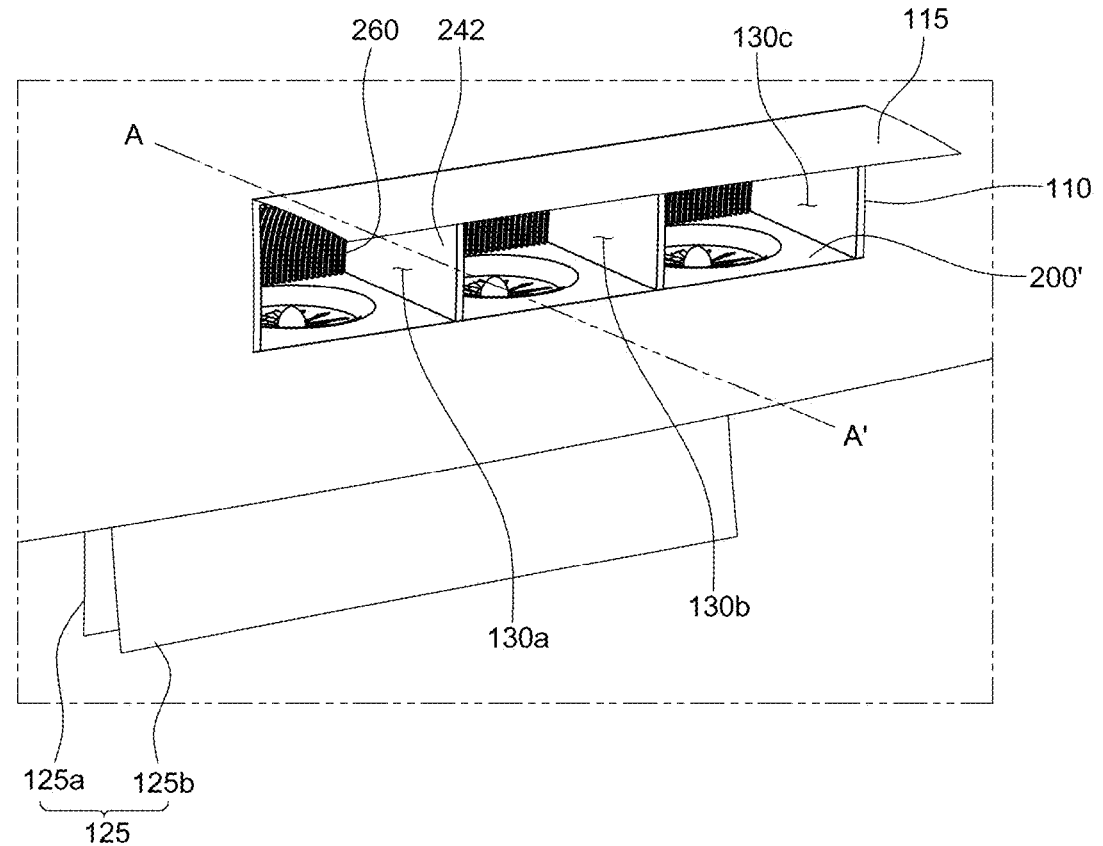
FIG. 11 is an enlarged view of an inlet of an aircraft according to another embodiment of the present invention.
Figure 12:
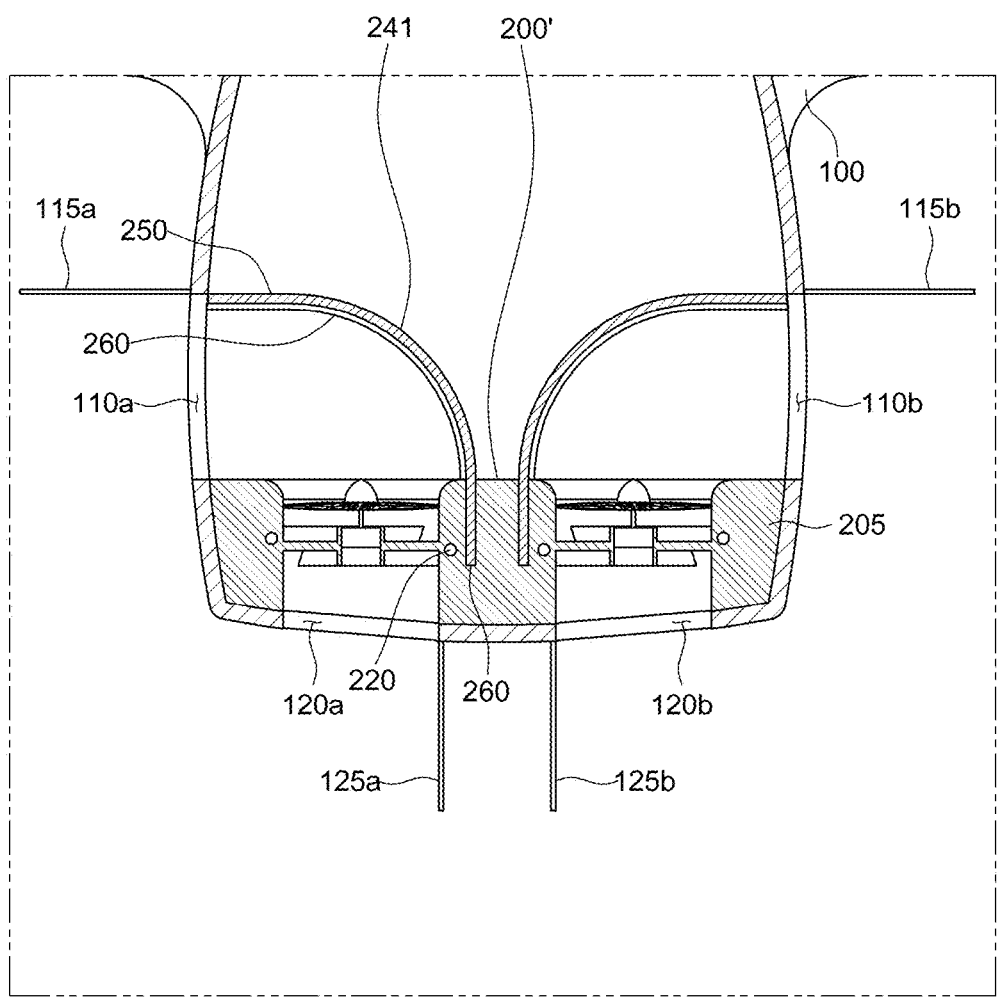
FIG. 12 is a cross-sectional view showing an aircraft according to another embodiment of the present invention taken along line A-A of FIG. 11.
Figure 13:
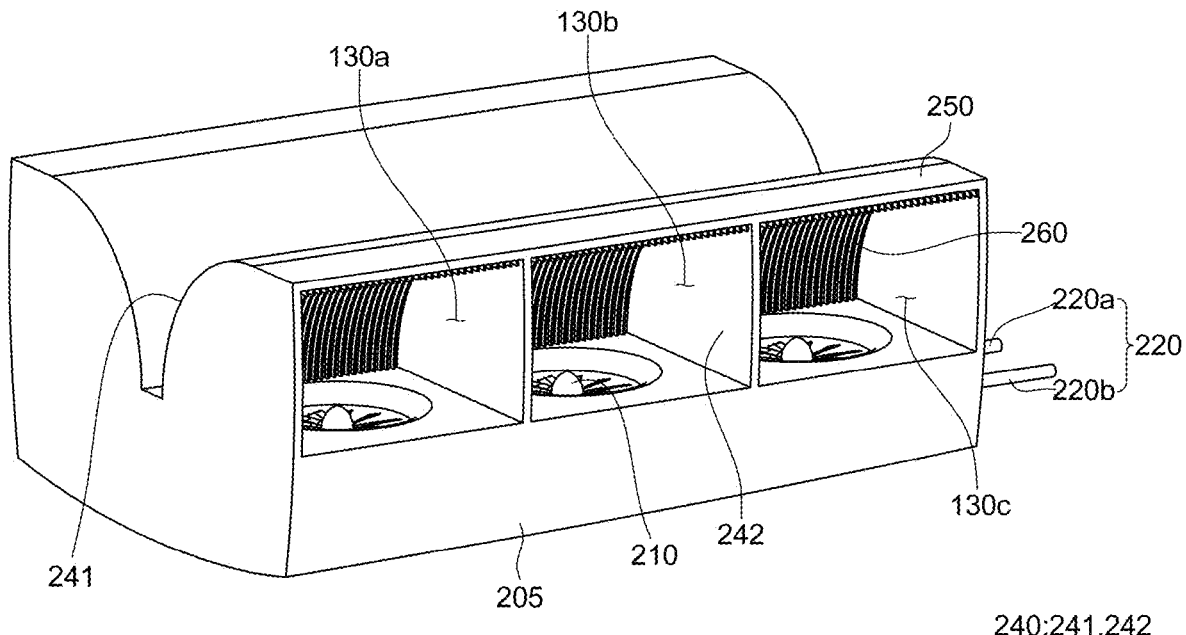
FIG. 13 is a perspective view showing a heat exchanger according to another embodiment of the present invention.
Figure 14:
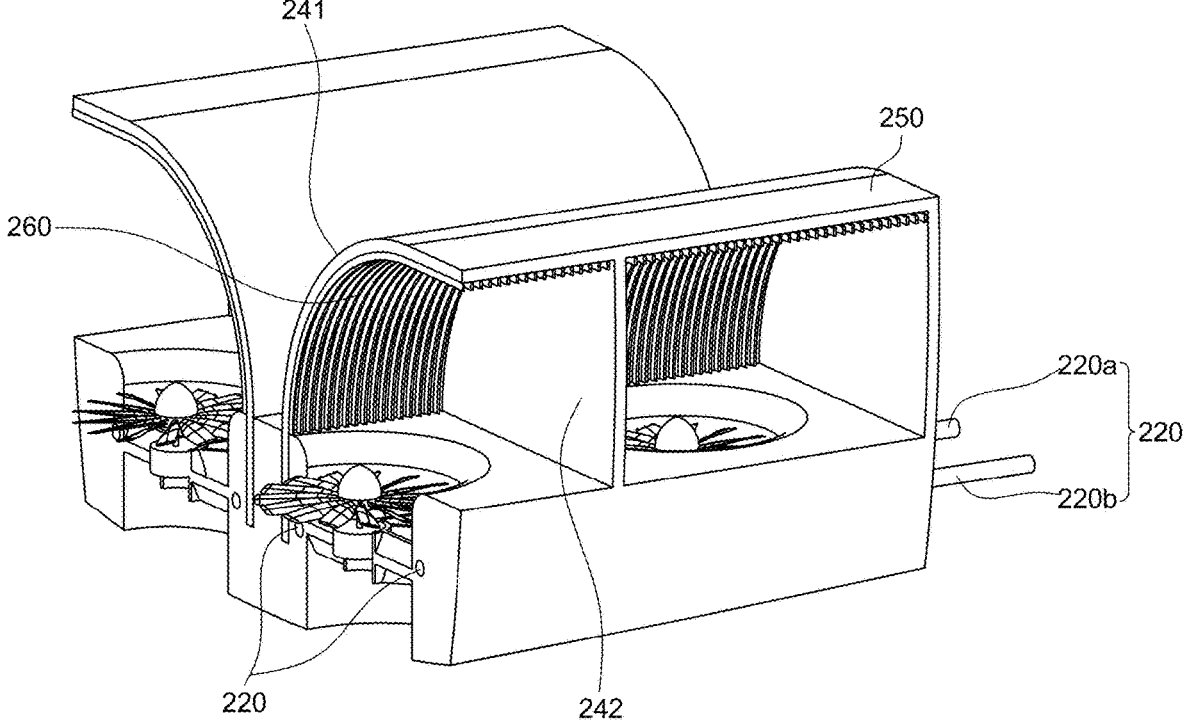
FIG. 14 is a view showing a cross-section of a heat exchanger according to another embodiment of the present invention.

FIG. 9 is a perspective view showing an aircraft according to another embodiment of the present invention, FIG. 10 is a bottom perspective view showing an aircraft according to another embodiment of the present invention, FIG. 11 is an enlarged view of an inlet of an aircraft according to another embodiment of the present invention, FIG. 12 is a cross-sectional view showing an aircraft according to another embodiment of the present invention taken along line A-A of FIG. 11, FIG. 13 is a perspective view showing a heat exchanger according to another embodiment of the present invention, and FIG. 14 is a view showing a cross-section of a heat exchanger according to another embodiment of the present invention.

Hereinafter, the aircraft 20 according to another embodiment of the present invention will be described with reference to FIGS. 9 to 14. At this time, explanation of parts that overlap with the aircraft 10 according to the previous embodiment will be omitted.

The aircraft 20 according to another embodiment of the present invention can be an aircraft 20 that can separate air flow between multiple fans 210 or prevent air flows generated by multiple fans 210 from interfering with each other.

The heat exchanger 200' according to another embodiment of the present invention can be formed with a structure supported by the inner surface of the fuselage 100. That is, so that the heat exchanger 200' can be supported and accommodated in the fuselage 100 whose inner surface (left and right inner surfaces and lower inner surface) is formed in a rounded shape, the outer surface (for example, both side surfaces and bottom surface in the width direction) of the housing 205 of the heat exchanger 200' can each be formed in a rounded shape corresponding to the outer surface of the fuselage 100. Thus, separation of the heat exchanger 200' from the fuselage 100 due to external impact can be suppressed or prevented.

Also, the heat exchanger 200' may further include a separation membrane 240, a cover 250, and heat exchange fins 260.

The separation membrane 240 can separate air flow between multiple fans 210 or prevent air flows generated by multiple fans 210 from interfering with each other. Below, in explaining the structure of the heat exchanger 200', an embodiment where multiple fans 210 are provided as 6 units and arranged in parallel in groups of 3 as shown in FIG. 13 will be described exemplarily. That is, 3 fans 210 can be arranged along the length direction of the fuselage 100, and 2 fans 210 can be arranged along the width direction.

The separation membrane 240 can be provided inside or outside the housing 205. That is, the separation membrane 240 can be installed between each receiving hole 215 (i.e., inside the housing 205) or on the outside of the housing 205 (housing exterior) for aerodynamic separation function between multiple fans 210. Below, the case where the separation membrane 240 is provided outside the housing 205 will be described exemplarily.

The separation membrane 240 is installed on the upper surface of the housing 205 and can suppress or prevent interference between air flows flowing into multiple fans 210. For this, the separation membrane 240 can include a first separation membrane 241 along the length direction and a second separation membrane 242 extending from the first separation membrane 241 along the width direction.

The first separation membrane 241 can be provided in a plate shape protruding upward from the housing 205. The first separation membrane 241 can be disposed between multiple fans 210 arranged in parallel (2 rows) with 3 each based on the width direction. The separation membrane 241 can be provided in a pair and can be spaced apart along the width direction.

Also, the surface of the first separation membrane 241 facing the inner surface of the fuselage 100 can be formed as a rounded surface. That is, the first separation membrane 241 can be formed in a rounded shape along the width direction from its bottom toward its top. Thus, the pair of first separation membranes 241 can be provided in a shape where the gap between them increases as they go from bottom to top. Therefore, when air is drawn into the inlet 110 along the width direction by the operation of the fan 210, the drawn air can move more smoothly toward the fan 210 being guided by the rounded surface of the first separation membrane 241.

The second separation membrane 242 can be provided in a plate shape extending from the first separation membrane 241 in the width direction. The second separation membrane 242 can have its bottom coupled to the upper surface of the housing 205, one end connected to the first separation membrane 241, and its other end coupled to the inner surface of the fuselage 100. The second separation membrane 242 is provided in plurality and can be arranged spaced apart between multiple fans 210 along the length direction. Thus, air can be independently drawn in from the inlet 110 and discharged through the outlet 120 without interference.

Below, a case where the second separation membrane 242 is provided as 8 units and 4 each are connected to the pair of first separation membranes 241 will be described exemplarily.

The height (i.e., length extending in the up-down direction) of the first separation membrane 241 and second separation membrane 242 can be modified according to the thrust or rotation speed of the multiple fans 210. For example, when the thrust of multiple fans 210 is large or the rotation speed is relatively high, the air flow ejected toward the fans 210 (i.e., the jet flow area) can be formed relatively long. Thus, the height of the first separation membrane 241 and second separation membrane 242 can be formed to be relatively higher by forming the up-down direction length of the first separation membrane 241 and second separation membrane 242.

Conversely, when the thrust of multiple fans 210 is small or the rotation speed is relatively low, the air flow ejected toward the fans 210 (i.e., the jet flow area) can be formed relatively short. Thus, the height of the first separation membrane 241 and second separation membrane 242 can be formed to be relatively lower by forming the up-down direction length of the first separation membrane 241 and second separation membrane 242. However, the structure and shape of the first separation membrane 241 and second separation membrane 242 are not limited to this and can be varied.

Meanwhile, the first separation membrane 241 and second separation membrane 242 can also be formed of a material that can exchange heat with air drawn through the inlet 110. For example, the first separation membrane 241 and second separation membrane 242 can be made of materials with high thermal conductivity, such as a mixture of graphite particles and nickel particles, to serve as a heat spreader. Thus, heat generated in the aircraft 10 can be transferred to the housing 205 and the first separation membrane 241 and second separation membrane 242 through the fuselage 100, and air drawn through the inlet 110 can promote the heat exchange process by contacting the first separation membrane 241 and second separation membrane 242. Therefore, overheating of the aircraft 10 can be suppressed or prevented.

The first separation membrane 241 and second separation membrane 242 can be configured to be integral with or detachable from the heat exchanger 200.

The cover 250 can extend from the first separation membrane 241 along the width direction to cover the space (i.e., gap) between the first separation membrane 241 and the inner surface of the fuselage 100.

The cover 250 connects between the first separation membrane 241 and the inner surface of the fuselage 100.

That is, the cover 250 can have one end coupled to the first separation membrane 241, its other end coupled to the inner surface of the fuselage 100, and its bottom coupled to the upper part of the second separation membrane 241. The cover 250 can be provided in a pair and can each be coupled to the pair of first separation membranes 241. For example, the cover 250 can form a protrusion-groove structure in parts contacting the first separation membrane 241, second separation membrane 242, and inner surface of the fuselage 100, and can be coupled to the first separation membrane 241, second separation membrane 242, and inner surface of the fuselage 100 through the aforementioned protrusion-groove structure.

Also, the cover 250 can extend horizontally along the width direction, or extend linearly corresponding to the bending rate of the first separation membrane 241. Thus, since the cover 250 covers the gap between the first separation membrane 241 and the inner surface of the fuselage 100, when air is drawn in through the inlet 110, air leakage through the aforementioned gap can be prevented. Therefore, air drawn through the inlet 110 can be stably guided to the fan 210.

Meanwhile, the inlet 110 can be partitioned into multiple sections by the second separation membrane 242. That is, the inlet 110 can be divided into multiple separate inlet passages by multiple separation membranes 242 extending in the width direction.

Meanwhile, the second separation membrane 242 can form spaces 130a, 130b, 130c between the first separation membrane 241, cover 250, and housing 205. Here, the aforementioned spaces 130a, 130b, 130c are partitioned into multiple sections by the multiple second separation membranes 242, and each of the spaces 130a, 130b, 130c can be independent areas. The aforementioned spaces 130a, 130b, 130c can correspond one-to-one with the multiple fans 210.

That is, one fan 210 can be disposed in one space 130*a* among the multiple spaces 130*a*, 130*b*, 130*c*. Thus, air can be drawn in separately through the inlet 110 partitioned by the second separation membrane 242, and air drawn separately through the inlet 110 into the multiple independent spaces 130*a*, 130*b*, 130*c* can be drawn into the fans 210 disposed in each space 130*a*, 130*b*, 130*c*. Therefore, since air is drawn independently into each space 130*a*, 130*b*, 130*c* without interference between the spaces, an aerodynamically separated state can be formed.

The heat exchange fins 260 can be formed across the cover 250, first separation membrane 241, and housing 205. That is, the heat exchange fins 260 are installed inside the cover 250, first separation membrane 241, and housing 205, and can absorb heat generated inside the cover 250, first separation membrane 241, and housing 205 (i.e., coolant flow path 220).

The heat exchange fins 260 can have at least a portion disposed inside the cover 250, first separation membrane 241, and housing 205, and at least a portion protruding from the curved surface of the cover 250 and first separation membrane 241. For example, the heat exchange fins 260 can be formed in a downwardly curved bent shape corresponding to the rounded shape of the cover 250 and first separation membrane 241. Also, the heat exchange fins 260 can be provided in plurality and can be spaced apart along the length direction on the inner surface of the cover 260 and first separation membrane 241.

Thus, a certain passage for air flow can be formed between the multiple heat exchange fins 260, promoting heat exchange between air drawn through the inlet 110 and the heat exchange fins 260. That is, the heat exchange can be performed relatively more quickly by increasing the contact area between the multiple heat exchange fins 260 and air.

As described above, the heat exchange fins 260 can have a portion installed inside the housing 205. For example, the lower part of the heat exchange fins 260 can be disposed adjacent to the medium flow path 220 that is relatively close to the inlet channel 220*a* among the aforementioned medium flow paths 220. Thus, the relatively high-temperature cooling medium drawn through the inlet channel 220*a* can be cooled before heat exchange with the multiple fans 210. Or, the relatively high-temperature cooling medium drawn through the inlet channel 220*a* can be cooled after heat exchange with the multiple fans 210. Thus, the relatively high-temperature cooling medium drawn through the inlet channel 220*a* can be cooled more stably through additional heat exchange with the heat exchange fins 260 in addition to the multiple fans 210.

Figure 15:
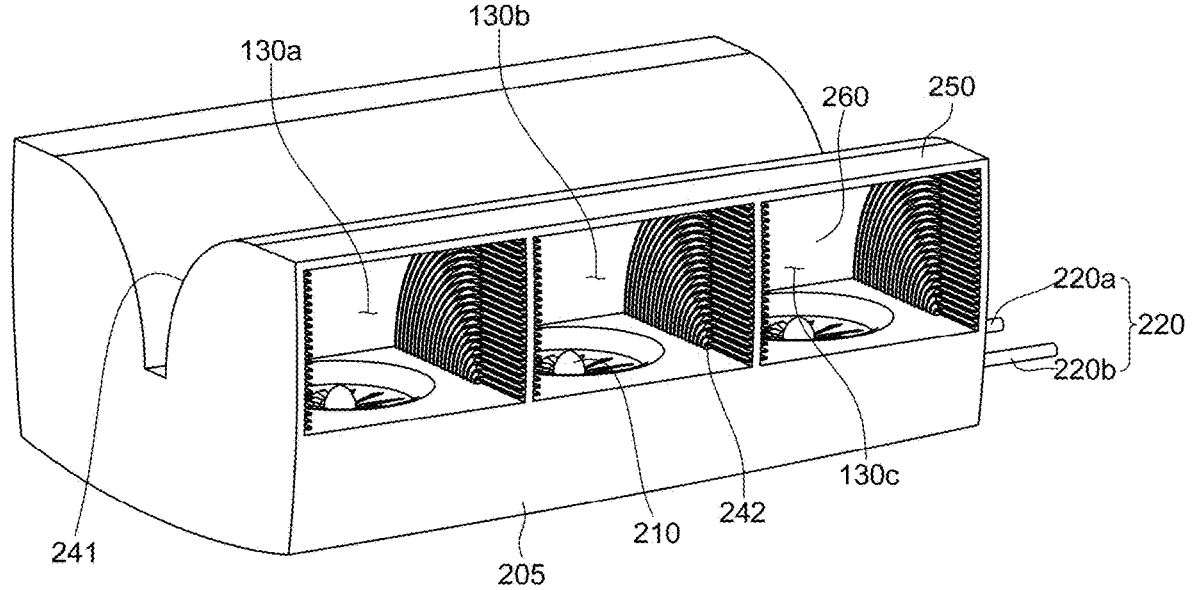
FIG. 15 is a perspective view according to a modified example of heat exchange fins.
Figure 16:
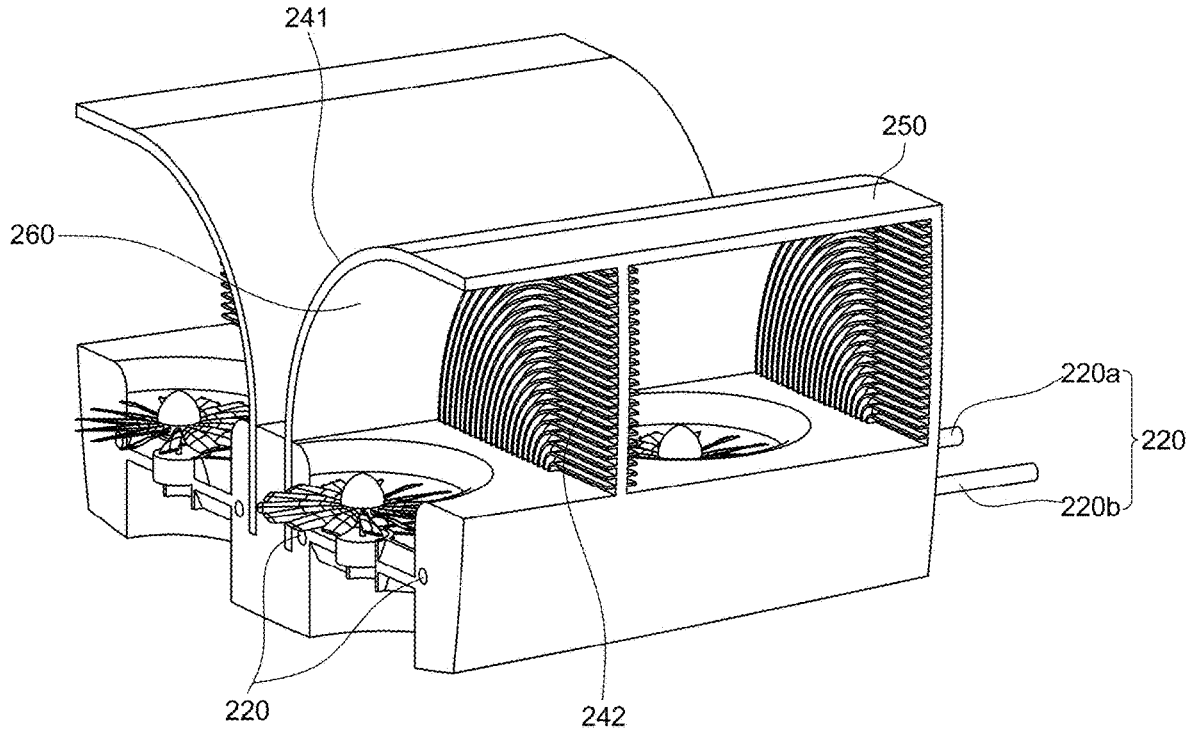
FIG. 16 is a view showing a cross-section of a heat exchanger according to a modified example of heat exchange fins.

FIG. 15 is a perspective view according to a modified example of heat exchange fins, and FIG. 16 is a view showing a cross-section of a heat exchanger according to a modified example of heat exchange fins.

Referring to FIGS. 15 and 16, the heat exchange fins 260 can also be formed on the side surfaces of the multiple second separation membranes 242. That is, as shown in FIGS. 15 and 16, multiple heat exchange fins 260 can be formed in a rounded curved shape and arranged spaced apart from bottom to top. Here, among the multiple heat exchange fins 260, the heat exchange fins 260 located relatively higher can be formed longer than the heat exchange fins 260 located relatively lower. Thus, based on the first separation membrane 241, multiple heat exchange fins 260 are arranged on both sides, allowing air drawn through the inlet 110 to contact relatively more heat exchange fins 260. That is, heat exchange can be performed relatively more quickly by increasing the contact area between the multiple heat exchange fins 260 and air. Meanwhile, the multiple heat exchange fins 260 can also be applied by processing as one body with the cover 250, first separation membrane 241, and housing 205 using metal printing processing technology.

While the embodiments of the present invention have been described in detail above with reference to the attached drawings, the present invention is not limited to such embodiments and can be variously modified and implemented within the scope that does not depart from the technical idea of the present invention. Therefore, the embodiments disclosed in the present invention are intended to explain rather than limit the technical idea of the present invention, and the scope of the technical idea of the present invention should not be limited by these embodiments. Therefore, the embodiments described above should be understood as being exemplary in all aspects and not restrictive. The protection scope of the present invention should be interpreted by the following claims, and all technical ideas within equivalent scope should be interpreted as being included in the rights scope of the present invention.

The invention claimed is:

1. An aircraft comprising:
a fuselage;
at least one inlet provided at a side of the fuselage;
at least one outlet provided at a bottom of the fuselage; and
a heat exchanger comprising a fan unit having at least one fan disposed between the at least one inlet and the at least one outlet along a fluid flow direction and drawing air inward through the at least one inlet to discharge through the at least one outlet.

2. The aircraft of claim 1, wherein the at least one fan is provided in plurality.

3. The aircraft of claim 2, wherein the plurality of fans are individually controlled.

4. The aircraft of claim 1, further comprising:
at least one first opening/closing plate that opens and closes the at least one inlet.

5. The aircraft of claim 4, further comprising:
at least one second opening/closing plate that opens and closes the at least one outlet.

6. The aircraft of claim 5, wherein the at least one first opening/closing plate is rotatably coupled to the fuselage and can adjust an opening degree of the at least one inlet.

7. The aircraft of claim 6, wherein the at least one second opening/closing plate is rotatably coupled to the fuselage and can adjust an opening degree of the at least one outlet.

8. The aircraft of claim 7, wherein the at least one inlet includes a first inlet and a second inlet disposed on each side of the fuselage, and the at least one first opening/closing plate is provided in plurality to respectively open and close the first inlet and the second inlet.

9. The aircraft of claim 8, wherein the plurality of first opening/closing plates are individually controlled.

10. The aircraft of claim 7, wherein the at least one outlet includes a first outlet and a second outlet disposed on the bottom of the fuselage, and the at least one second opening/closing plate is provided in plurality to respectively open and close the first outlet and the second outlet.

11. The aircraft of claim 10, wherein the plurality of second opening/closing plates are individually controlled.

12. The aircraft of claim 10, wherein the at least one fan includes a first fan and a second fan disposed on each side of the fuselage, the first outlet is disposed at a position corresponding to the first fan, and the second outlet is disposed at a position corresponding to the second fan.

13. The aircraft of claim 1, wherein the fan unit is configured to guide heat generated in the fuselage to an outside of the fuselage by discharging air, drawn into an interior of the fuselage through the at least one inlet, through the at least one outlet.

14. The aircraft of claim 13, wherein the fan unit includes:
a housing; and
a medium flow path provided inside the housing through which heat exchange medium can flow; and
the at least one fan is rotatably disposed inside the housing to draw air from around the housing into the inside of the housing and discharge it to an outside of the housing, thereby promoting heat exchange between the air around the housing and the heat exchange medium flowing through the medium flow path, and providing thrust or thrust vectoring to the fuselage.

15. The aircraft of claim 2, wherein the fan unit includes at least one separation membrane that separates air flow between the plurality of fans or prevents interference of air flows generated by the plurality of fans.

16. The aircraft of claim 2, comprising:
a plurality of wings extending from the fuselage; and a plurality of rotors provided on each of the plurality of wings;
wherein movement of the fuselage is controlled by controlling at least one of the plurality of rotors and at least one of the plurality of fans.

17. An aircraft comprising:
a fuselage;
a heat exchanger disposed inside the fuselage;
at least one inlet formed in a side portion of the fuselage and guiding fluid from outside the fuselage to the heat exchanger; and
at least one outlet formed in a bottom portion of the fuselage and guiding the fluid, heat-exchanged in the heat exchanger, to the outside of the fuselage;
wherein the heat exchanger provides thrust or thrust vectoring to the fuselage by discharging the fluid, drawn into the interior of the fuselage through the at least one inlet, through the at least one outlet.

18. The aircraft of claim 17, wherein the heat exchanger includes:
a housing; and
at least one fan rotatably disposed inside the housing and discharging the fluid, drawn into the interior of the fuselage through the at least one inlet, through the at least one outlet.

19. The aircraft of claim 18, wherein the at least one fan is provided in plurality, and the heat exchanger further includes at least one separation membrane provided inside or outside the housing to separate air flow between the plurality of fans or prevent interference of air flows generated by the plurality of fans.

* * * * *